US008022993B2

United States Patent
Sakamoto et al.

(10) Patent No.: US 8,022,993 B2
(45) Date of Patent: Sep. 20, 2011

(54) IMAGE SUPPLY DEVICE TRANSMITTING IMAGE DATA TO A RECORDING APPARATUS, COMMUNICATION APPARATUS, RECORDING SYSTEM AND CONTROL METHOD THEREOF

(75) Inventors: Kazuya Sakamoto, Kanagawa (JP); Takao Aichi, Tokyo (JP); Kentaro Yano, Kanagawa (JP); Fumihiro Goto, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1347 days.

(21) Appl. No.: 10/859,363

(22) Filed: Jun. 3, 2004

(65) Prior Publication Data

US 2005/0024497 A1 Feb. 3, 2005

(30) Foreign Application Priority Data

Jun. 4, 2003 (JP) ................................. 2003-159543

(51) Int. Cl.
*H04N 5/225* (2006.01)
(52) U.S. Cl. .................. 348/207.2; 348/207.1
(58) Field of Classification Search ................ 348/207.2
See application file for complete search history.

(56) References Cited

U.S. PATENT DOCUMENTS

| 4,720,813 | A * | 1/1988 | Kaneko ............................ 710/16 |
| 6,507,358 | B1 | 1/2003 | Mori et al. ........................ 348/42 |
| 6,552,743 | B1 * | 4/2003 | Rissman .................... 348/207.2 |
| 7,199,891 | B1 | 4/2007 | Ihara ............................ 358/1.15 |
| 7,379,198 | B1 * | 5/2008 | Ishida .......................... 358/1.15 |
| 7,394,854 | B2 * | 7/2008 | Nishio et al. ............. 375/240.25 |
| 2001/0013949 | A1 * | 8/2001 | Tateyama ..................... 358/1.16 |
| 2003/0067620 | A1 | 4/2003 | Masumoto et al. ......... 358/1.13 |
| 2003/0067638 | A1 | 4/2003 | Yano ............................ 358/540 |
| 2003/0081251 | A1 * | 5/2003 | Tanaka et al. ................ 358/1.15 |
| 2003/0156196 | A1 | 8/2003 | Kato et al. ................ 348/207.2 |
| 2003/0227554 | A1 * | 12/2003 | Kazami et al. ............. 348/231.3 |
| 2004/0021902 | A1 | 2/2004 | Ogiwara et al. ............. 358/1.15 |
| 2004/0046990 | A1 | 3/2004 | Yano et al. ................... 358/1.15 |
| 2004/0070672 | A1 | 4/2004 | Iwami et al. ............... 348/207.2 |

(Continued)

FOREIGN PATENT DOCUMENTS

JP 1-263782 10/1989

(Continued)

OTHER PUBLICATIONS

Microprocessor and Microcomputer Standards Committee, IEEE Standard Signaling Method for a Bidirectional Parallel Peripheral Interface for Personal Computer (IEEE Std 1284-2000), Sep. 21, 2000.*

Japanese Office Action issued Aug. 22, 2008, in Japanese Application No. 2003-159543.

*Primary Examiner* — Lin Ye
*Assistant Examiner* — Chia-Wei A Chen
(74) *Attorney, Agent, or Firm* — Fitzpatrick, Cella, Harper & Scinto

(57) ABSTRACT

An image supply device is capable of transmitting image data to a recording apparatus so as to record an image, receiving status information transmitted as a code from the recording apparatus, determining the degree of interpretation of plural-level information corresponding to a device level included in the received code, determining an interpretation level for the plural-level information included in the code and interpreting the code. Then, the device determines information based on the result of the interpretation and notifies a user of the information.

3 Claims, 17 Drawing Sheets

```
· · XXXX  YYYY
XXXX : MAJOR CODE
YYYY : MINOR CODE
      MEANINGS OF YYYY DETERMINED
      BY FOLLOWING VALUES
         0000 ----- DEFAULT
       0001 ~ 7FFFH --------- COMMON CODE FOR RESPECTIVE MAKER
     8000H ~ 0FFFFH --------- VENDOR'S UNIQUE CODE
```

U.S. PATENT DOCUMENTS

| | | | |
|---|---|---|---|
| 2004/0122649 A1* | 6/2004 | Bartek et al. | 703/23 |
| 2004/0160632 A1 | 8/2004 | Kato et al. | 358/1.15 |
| 2004/0207869 A1* | 10/2004 | Endo | 358/1.15 |
| 2005/0246426 A1* | 11/2005 | Motoyama et al. | 709/209 |

FOREIGN PATENT DOCUMENTS

| | | |
|---|---|---|
| JP | 7-320130 | 12/1995 |
| JP | 9-128180 | 5/1997 |
| JP | 2001-128116 | 5/2001 |
| JP | 2002-154614 | 5/2002 |

* cited by examiner

FIG. 7

```
<startJob>
  <jobConfig>
    <quality>50000000</quality>                    —— 700
    <paperSize>51060000</paperSize>                —— 701
    <paperType>52020000</paperType>                —— 702
    <fileType>53000000</fileType>                  —— 703
    <datePrint>54010000</datePrint>                —— 704
    <fileNamePrint>55000000</fileNamePrint>        —— 705
    <imageOptimize>56000000</imageOptimize>        —— 706
    <fixedSize>58030000</fixedSize>                —— 707
    <cropping>59000000</cropping>                  —— 708
  </jobConfig>
  <printInfo>
    <fileId>00000001</fileId>                      —— 709
    <date>2002/10/28</date>                        —— 710
  </printInfo>
</startJob>
```

720 → jobConfig block (700–708)
721 → printInfo block (709–710)

FIG. 8A

Notify / Get Job Status

| prtPID | ImagePath | copyID | progress | Image Printed |
|--------|-----------|--------|----------|---------------|

FIG. 8B

Notify / Get Device Status

| dpsPrint ServiceStatus | jobEnd Reason | error Status | error Reason | disconnect Enable | Capability Changed | newJobOK |
|---|---|---|---|---|---|---|

FIG. 15

```
· XXXX  YYZZ ·
XXXX · MAJOR CODE
YY ··· MINOR CODE
ZZ ··· DETAIL CODE
      MEANINGS OF YY AND ZZ ARE COMMONLY
      DETERMINED BY FOLLOWING VALUES
          00 ----- DEFAULT
        01 ~ 7FH --------- COMMON CODE FOR RESPECTIVE MAKER
      80H ~ 0FFH --------- VENDOR'S UNIQUE CODE
```

FIG. 16

··XXXX  YYYY
XXXX : MAJOR CODE
YYYY : MINOR CODE
       MEANINGS OF YYYY DETERMINED
       BY FOLLOWING VALUES
            0000 ----- DEFAULT
      0001 ~ 7FFFh --------- COMMON CODE FOR RESPECTIVE MAKER
   8000h ~ 0FFFFh --------- VENDOR'S UNIQUE CODE

IMAGE SUPPLY DEVICE TRANSMITTING IMAGE DATA TO A RECORDING APPARATUS, COMMUNICATION APPARATUS, RECORDING SYSTEM AND CONTROL METHOD THEREOF

FIELD OF THE INVENTION

The present invention relates to an image supply device such as a digital camera, a communication apparatus, a recording system and control method thereof.

BACKGROUND OF THE INVENTION

In recent years, a digital camera (image sensing apparatus) which obtains an image by image sensing with a simple operation and converts the obtained image into digital image data is widely used. Generally, in a case where an image obtained by this camera is printed as a photograph, the digital image data is temporarily read from the digital camera into a PC (computer), then image processing is performed in the PC, and the processed data is outputted from the PC to a color printer and print-outputted.

On the other hand, recently developed are a color print system which directly transmits digital image data from a digital camera to a color printer to print-output the image data, and a so-called photo-direct (PD) printer, to which a memory card, installed in a digital camera for storage of images obtained by image sensing is directly attached, and which prints the images stored in the memory card.

To directly transmit image data to a color printer, there is a need for standardization of an interface specification and an operation method and the like among digital cameras and color printers by respective makers. For such standardization, a guideline for realization of DPS (Direct Print System) has been proposed.

However, in a case where an error occurs in a printer which receives image data from an image supply device other than a digital camera, such as a DVD or a cellular phone with camera, and the printer is to notify the image supply device of the error, it is impossible to communicate detailed error information as defined in the above DPS. To use the specification for error notification in correspondence with such an image supply device other than the digital camera defined in the DPS, a code system only to notify simplified and abstract information is employed. Thus the high level user interface is wasted.

SUMMARY OF THE INVENTION

The present invention has been made in consideration of the above conventional art, and has its feature to provide an image supply device, a communication apparatus, a recording system and control method thereof to interpret information included in a received code and notify a user of the information in correspondence with a device level of an image supply device.

According to an aspect of the present invention, there is provided with an image supply device capable of transmitting image data to a recording apparatus so as to record an image, comprising: reception means for receiving a code, including plural-level information corresponding to a device level of the image supply device, transmitted from the recording apparatus; interpretation means for determining an interpretation level of the plural-level information included in the code and interpreting the code; and notification means for notifying a user based on the result of interpretation at the interpretation level by the interpretation means.

According to another aspect of the present invention, there is provided with a recording system for transmitting image data from an image supply device to a recording apparatus so as to record an image, wherein the recording apparatus has transmission means for transmitting a code including plural-level information corresponding to a device level of the image supply device, the image supply device comprising:
reception means for receiving a code transmitted from the recording apparatus; interpretation means for determining an interpretation level of plural-level information included in the code and interpreting the code; and notification means for notifying a user based on the result of interpretation at the interpretation level by the interpretation means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts an example of a print start command issued from the DSC according to the embodiment;

FIGS. 8A and 8B depict tables explaining a JobStatus and a DeviceStatus according to the embodiment;

FIG. 15 depicts an explanatory diagram of a code format for notification from the PD printer to the DSC according to the embodiment;

FIG. 16 depicts an explanatory diagram of another code format for notification from the PD printer to the DSC according to the embodiment.

DETAILED DESCRIPTION OF THE PREFERRED EMBODIMENT

A preferred embodiment of the present invention will now be described in detail in accordance with the accompanying drawings.

Figure 1:
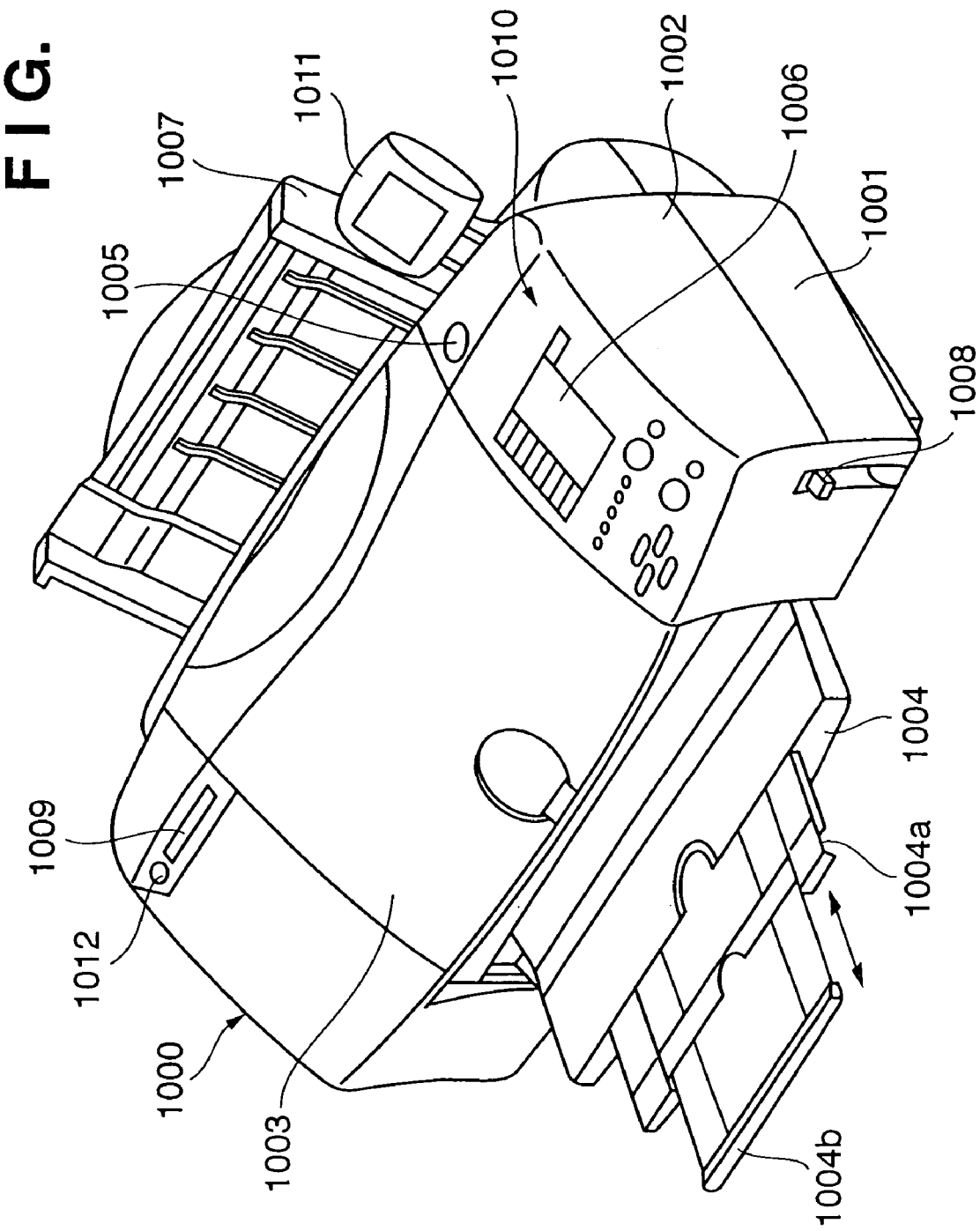
FIG. 1 depicts a perspective view of a PD printer according to an embodiment of the present invention.

FIG. 1 depicts a perspective view of a photo-direct printer (hereinbelow, PD printer) 1000 according to an embodiment of the present invention. The PD printer 1000 has a general PC printer function of receiving data from a host computer (PC) and print-outputting the data, and a function of directly reading image data stored in a storage medium such as a memory card or receiving image data from a digital camera and performing printing.

In FIG. 1, the main body as an outer shell of the PD printer 1000 has a lower case 1001, an upper case 1002, an access cover 1003 and a discharge tray 1004. The lower case 1001 forms an approximate lower half part of the PD printer 1000, and the upper case 1002 forms an approximate upper half part of the main body. The combination of both cases produces a hollow structure having accommodation space for respective mechanisms to be described later. The structure has openings in its upper surface and front surface. Further, the discharge tray 1004 is rotatably held at its one end in the lower case 1001. The rotation of the discharge tray 1004 opens/closes the opening in the front surface of the lower case 1001. In this arrangement, upon execution of print operation, the discharge tray 1004 is rotated to the front surface side to open the opening, thereby permitting print sheets to be discharged from the opening and to be sequentially stacked. The discharge tray 1004 includes two auxiliary trays 1004a and 1004b. The sheet support area of the discharge tray 1004 can be expanded or reduced in three steps by pulling out the respective trays in accordance with necessity.

The access cover 1003, rotatably held at its one end in the upper case 1002, opens/closes the opening formed in the upper surface. When a printhead cartridge (not shown), an ink tank (not shown) or the like accommodated in the main body is exchanged, the access cover 1003 is opened. Note that although not particularly shown, when the access cover 1003 is opened/closed, a projection formed on the rear surface of the access cover 1003 rotates a cover opening/closing lever with a micro switch or the like. The open/close status of the access cover 1003 can be detected by detecting the rotated position of the lever.

A power key 1005 is provided on the upper surface of the upper case 1002. Further, an operation panel 1010 having a liquid crystal display 1006, various key switches and the like, is provided on the right side of the upper case 1002. The structure of the operation panel 1010 will be described in detail with reference to FIG. 2. Reference numeral 1007 denotes an automatic feeder which automatically feeds print sheets into the apparatus main body. Numeral 1008 denotes a sheet interval selection lever to control the interval between a printhead and a print sheet. Numeral 1009 denotes a card slot into which an adapter, to which a memory card is attachable, is inserted. Image data stored in the memory card is directly read via the adapter and print-outputted. As the memory card (PC), compact flash (registered trademark) memory, smart media, a memory stick and the like may be used. Numeral 1011 denotes a viewer (liquid crystal display) attachable/removable to/from the PD printer 1000 main body. In a case where the PC card is searched for an image to be printed, images are displayed by 1 frame or index images are displayed on the viewer. Numeral 1012 denotes a USB terminal for connection with a digital camera to be described later. Further, a USB connector for connection with a personal computer (PC) is provided on a rear surface of the PD Printer 1000.

Figure 2:
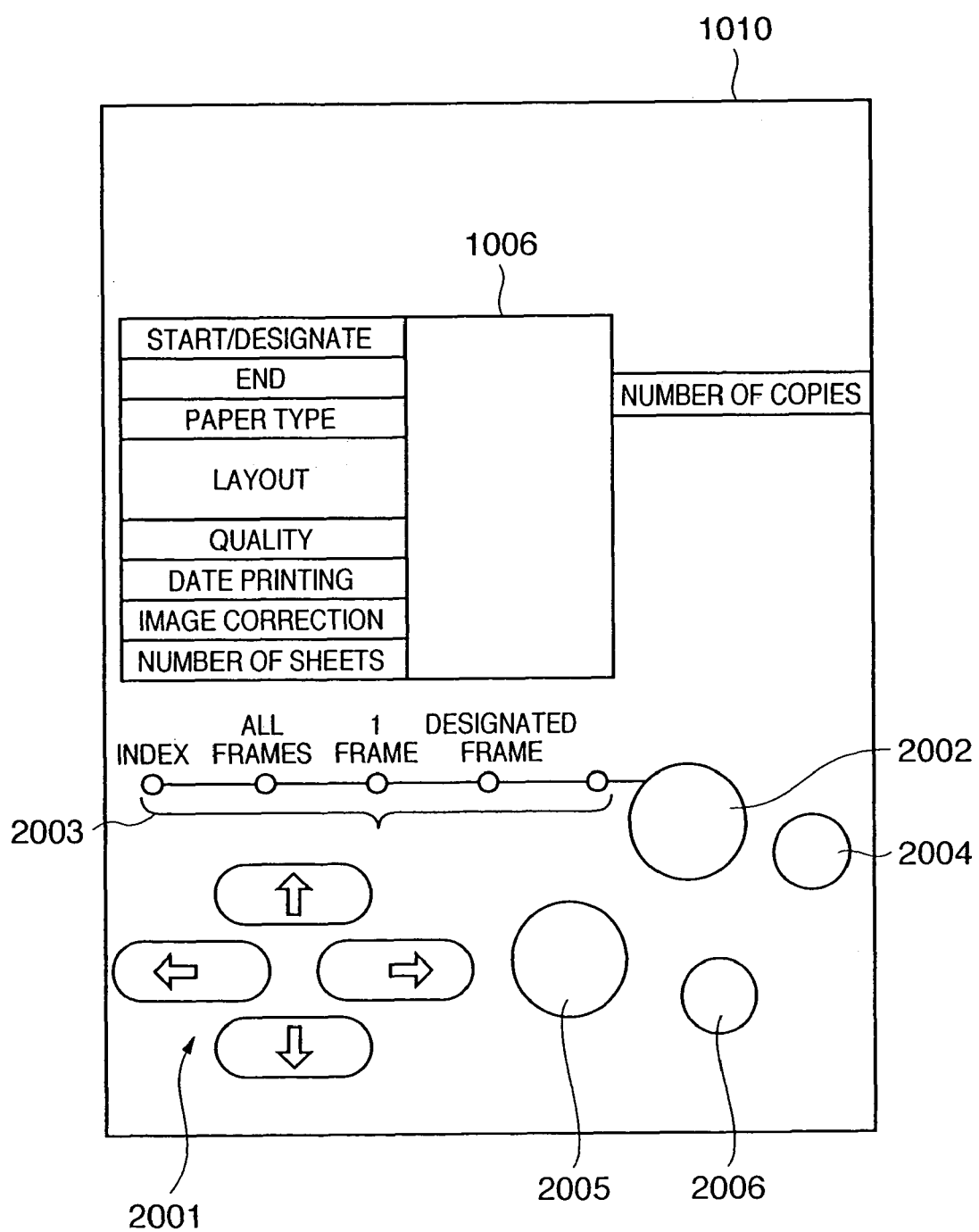
FIG. 2 depicts a schematic view showing an operation panel of the PD printer according to the embodiment.

FIG. 2 depicts a schematic view showing the operation panel 1010 of the PD printer 1000 according to the present embodiment.

In FIG. 2, the liquid crystal display 1006 displays menu items for various settings of data regarding items printed on left and right sides. The displayed items include, e.g., a head picture number of plural image files to be printed, a designated frame number (start frame designation/print frame designation), a last picture number to be printed (end), the number of printouts (copies), the type of paper (print sheet) used in printing (paper type), the number of pictures printed on one sheet (layout), a designation of printing quality (quality), designation as to whether or not the date of photographing is to be printed (date printing), a designation as to whether or not picture correction is made before printing (image correction), the number of necessary print sheets (number of sheets) and the like. The respective items are selected or designated with cursor keys 2001. Numeral 2002 denotes a mode key. The type of printing (index printing, all frame printing, one frame printing and the like) is changed by each depression of the mode key 2002, and a corresponding LED of the LED 2003 is turned on. Numeral 2004 denotes a maintenance key for performing printer maintenance such as cleaning of the print head; numeral 2005 denotes a print start key which is depressed to designate the start of printing or establish a maintenance setting; and numeral 2006 denotes a print stop key which is depressed to stop printing or designate stopping of maintenance processing.

Figure 3:
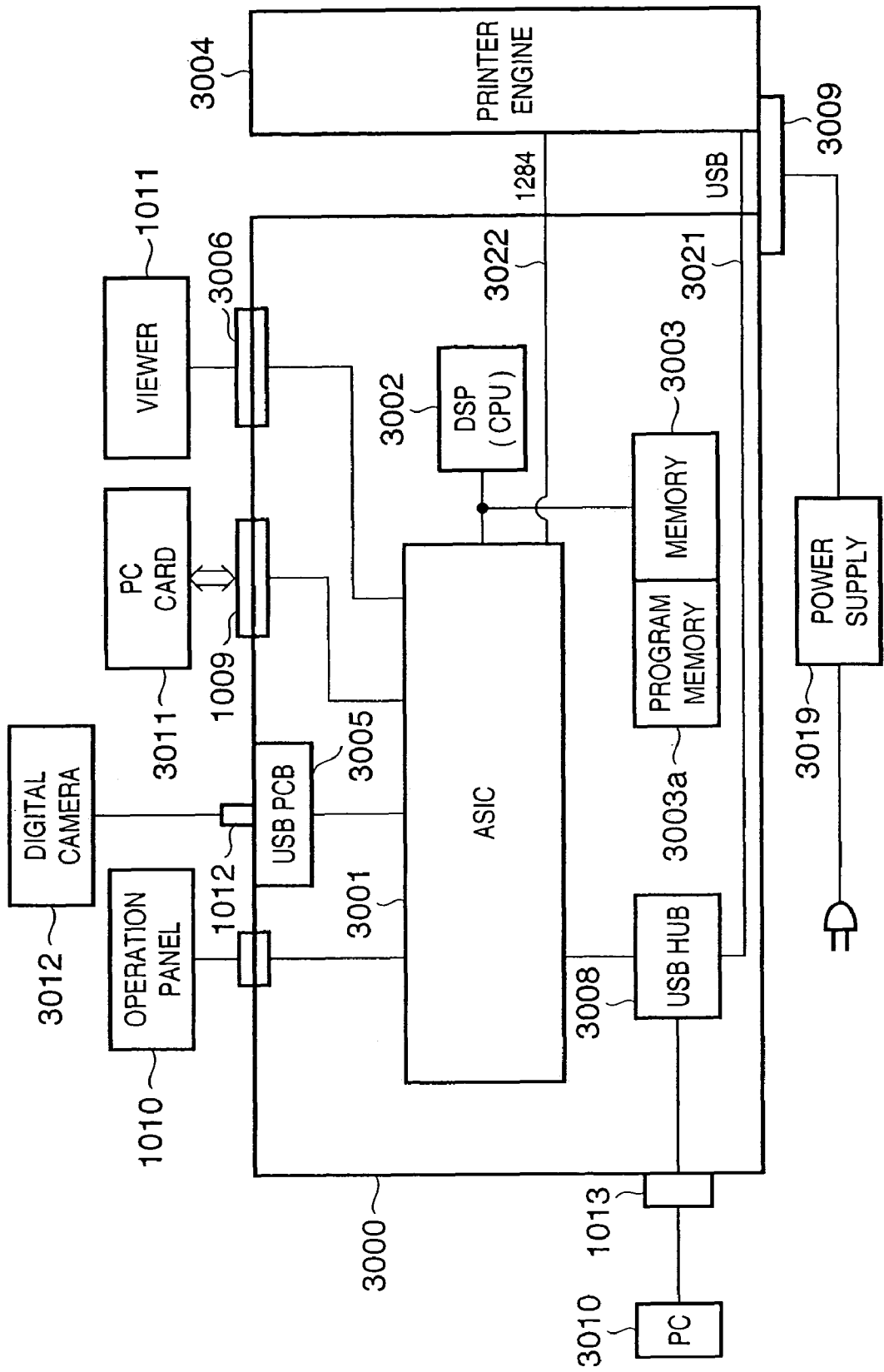
FIG. 3 is a block diagram showing the arrangement of principal elements concerning control of the PD printer according to the embodiment.

Next, the arrangement of the principal elements concerning control of the PD printer 1000 according to the present embodiment will be explained with reference to FIG. 3. In FIG. 3, elements corresponding to those in the above-described figures have the same reference numerals, and explanations thereof will be omitted.

In FIG. 3, numeral 3000 denotes a controller (control board); numeral 3001 denotes an ASIC (application specific LSI); numeral 3002 denotes a DSP (Digital Signal Processor) which incorporates a CPU and performs various control processings to be described later and image processings such as conversion from luminance (RGB) signals to density (CMYK) signals, scaling, gamma conversion, and error diffusion; numeral 3003 denotes a memory having a program memory 3003a for storing the control program for the CPU of the DSP 3002, a RAM area for storing variables and the like upon execution of program, and a memory area functioning as a work memory for storing image data and the like; numeral 3004 denotes a printer engine which is an ink-jet print type printer engine for printing a color image by using a plurality of color inks; numeral 3005 denotes a USB connector serving as a port for connection with a digital camera (DSC) 3012; numeral 3006 denotes a connector for connection with the viewer 1011; and numeral 3008 denotes a USB hub which transmits data from a PC 3010 to the printer engine 3004 via a USB 3021 when the PD printer 1000 performs printing based on image data from the PC 3010. Thus, the connected PC 3010 can directly exchange data and signals with the printer engine 3004 and execute printing (functions as a general PC printer). Numeral 3009 denotes a power connector which receives a DC voltage converted from a commercial AC voltage from a power supply 3019. The PC 3010 is a general personal computer; numeral 3011 denotes the above-described memory card (PC card); and numeral 3012 denotes the digital camera (DSC: Digital Still Camera).

Note that signal exchange between the controller 3000 and the printer engine 3004 is performed via the above-described USB 3021 or an IEEE 1284 bus 3022.

Figure 4:
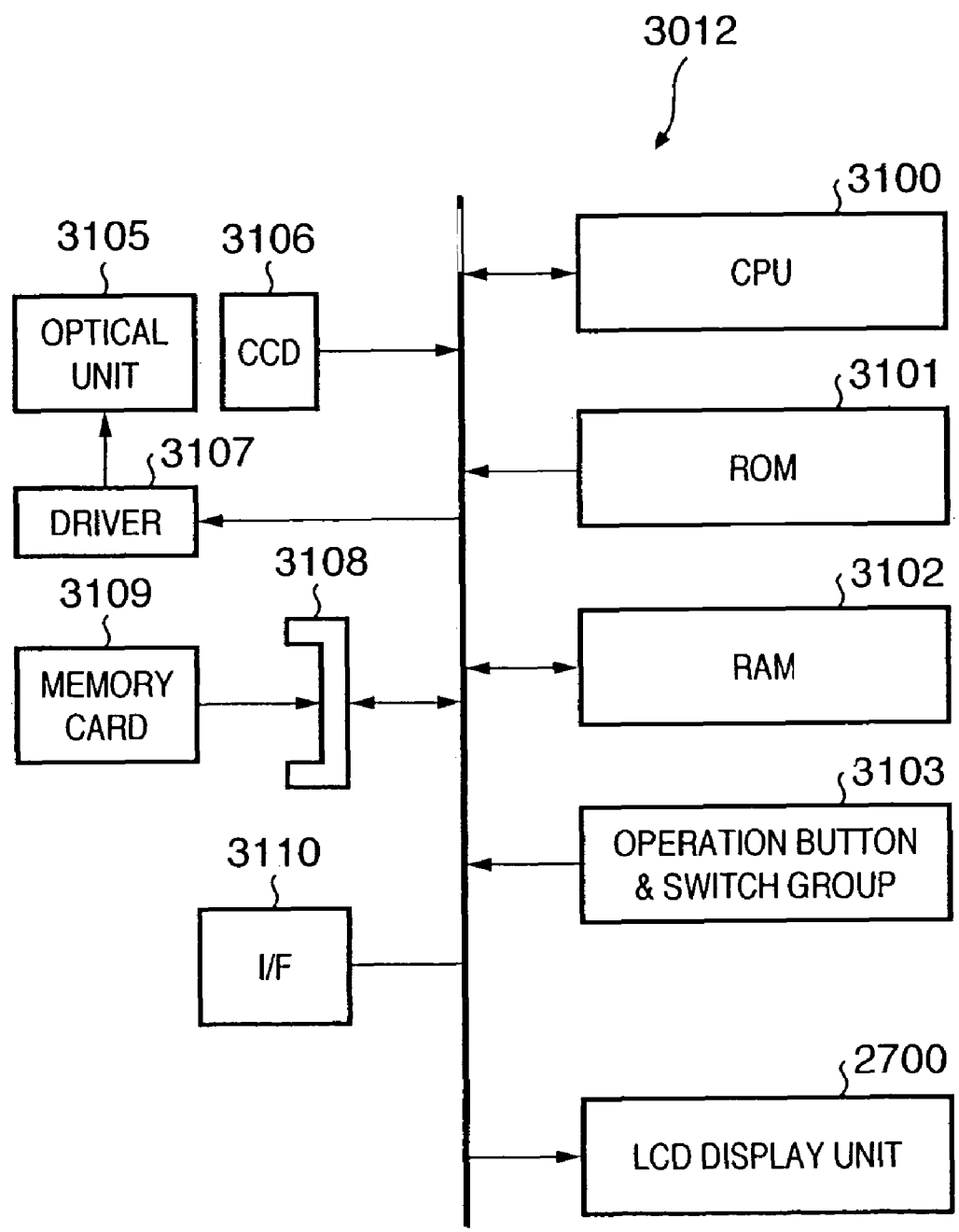
FIG. 4 is a block diagram showing the construction of a DSC according to the embodiment.

FIG. 4 is a block diagram showing the construction of a DSC (digital camera) 3012 according to the present embodiment.

In FIG. 4, numeral 3100 denotes a CPU which controls the overall DSC 3012; numeral 3101 denotes a ROM holding a processing procedure performed by the CPU 3100; numeral 3102 denotes a RAM used as a work area for the CPU 3100; numeral 3103 denotes a switch group for various operations including various switches and cursor keys; numeral 2700 denotes a liquid crystal display to display a currently-sensed video image, images already obtained by image sensing and stored, or to make various settings (UI image); numeral 3105 denotes an optical unit mainly comprising a lens and its drive system; numeral 3106 denotes a CCD device; numeral 3107 denotes a driver to drive-control the optical unit 3105 under the control of the CPU 3100; numeral 3108 denotes a connector for connection with the storage medium 3109 (compact flash (registered trademark) memory card, smart media and the like); and numeral 3110 denotes a USB interface (on the USB slave side) for connection with the PC or the PD printer 1000 in the present embodiment.

Figure 5:
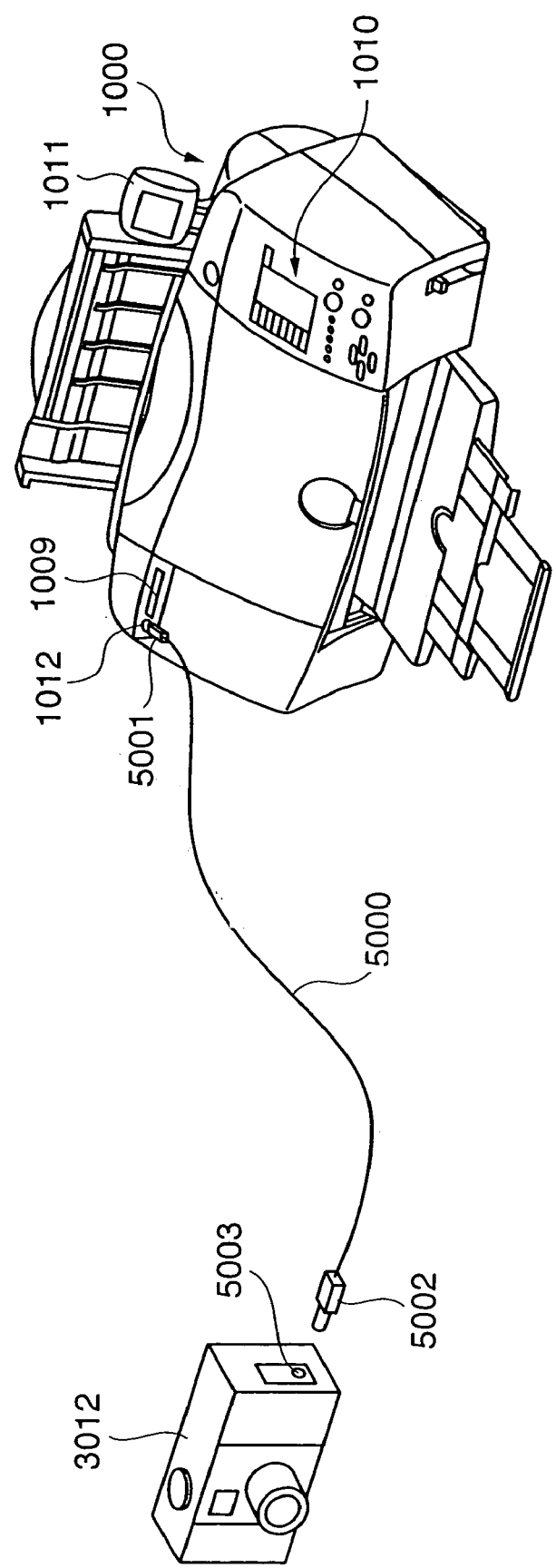
FIG. 5 depicts a perspective view explaining the connection between the PD printer and a digital camera according to the embodiment.

FIG. 5 depicts a perspective view explaining the connection between the PD printer 1000 and the DSC 3012 according to the present embodiment. In FIG. 5, elements corresponding to those in the above-described figures have the same reference numerals, and explanations thereof will be omitted.

In FIG. 5, a cable 5000 has a connector 5001 for connection with the connector 1012 of the PD printer 1000 and a connector 5002 for connection with the connector 5003 of the digital camera 3012. The digital camera 3012 can output image data stored in its internal memory via the connector 5003. Note that various constructions of the digital camera 3012, such as an internal memory provided as storage means or a slot for attachment of a removable memory, may be employed. In this manner, as shown in FIG. 5, the PD printer 1000 is connected with the digital camera 3012 via the cable 5000, so that image data from the digital camera 3012 can be directly print-outputted by the PD printer 1000.

Hereinbelow, an example of operation of a print system according to the present embodiment based on the above construction will be described.

A print system including the DSC 3012 and the PD printer 1000 based on the above construction will be described. Note that in the print system, the DSC 3012 and the PD printer 1000 can perform operations in conformance with the specification of a procedure DPS (Direct Print System) according to the present embodiment.

Figure 6:
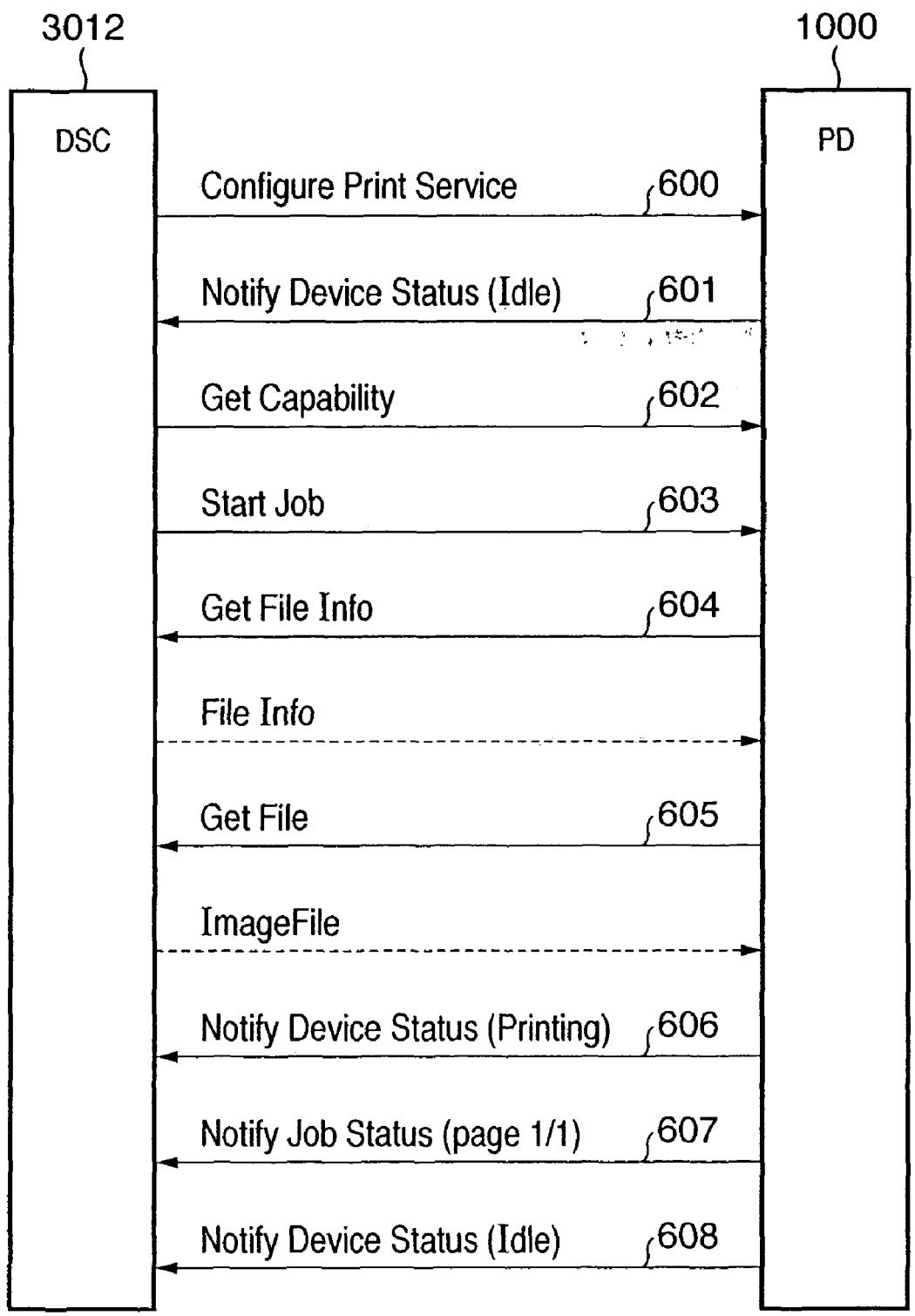
FIG. 6 depicts a chart showing command transmission between the PD printer and the DSC in a print system according to the embodiment.

FIG. 6 depicts a chart showing a procedure in a case where a print request is issued from the DSC 3012 to the PD printer 1000 to perform printing.

This process procedure is executed when the PD printer 1000 and the DSC 3012 have been connected via the USB cable 5000 and it has been checked that these devices are compliant with the DPS specification. First, the DSC 3012 transmits "ConfigurePrintService" to the PD printer 1000, to check the status of the PD printer 1000 (600). In response to the command, the PD printer 1000 notifies the DSC 3012 of its status at that time ("idle" status here) (601). Then the DSC 3012 inquires about the Capability of the PD printer 1000 (602), and issues a print start request (StartJob) (603) corresponding to the Capability. Note that the print start request is issued if "newJobOK" in the status information from the PD printer 1000 to be described later is "True" at timing 601.

Further, the Capability is information on the capability of the device for execution of control in correspondence with the capability of the device. Further, in the image supply device, a print condition for an image to be printed can be set in correspondence with the Capability of the image receiving side.

In response to the print start request, the PD printer 1000 requests file information from the DSC 3012 based on a file ID of print-designated image data (604). In response to the request, the file information is transmitted from the DSC 3012. The file information includes information such as a file capacity. Then the PD printer 1000 receives the file information, and if the printer 1000 determines that it is possible to process the file, the PD printer 1000 requests the file from the DSC 3012 (605). Then image data of the requested file is transmitted from the DSC 3012 to the PD printer 1000. The PD printer 1000 starts print processing, and status information indicating "in printing (Printing)" is sent from the PD printer 1000 to the DSC 3012 in "NotifyDeviceStatus" (606). When the print processing for one page has been completed, upon start of processing for the next page, the termination of processing for one page is notified in "NotifyJobStart" (607) from the PD printer 1000. In the case of printing only for one page, when the printing for the print-requested page has been completed, it is indicated that the status of the PD printer 1000 has become "idle" in "NotifyDeviceStatus" (608). For example, in the case of N-up printing to lay out plural (N) images in one page, upon printing of N images, "NotifyJobStatus" (607) is sent from the PD printer 1000 to the DSC 3012. The timing of issuance of "NotifyJobStatus" and "NotifyDeviceStatus" and the order of acquisition of image data is merely an example, but the issuance and image acquisition may occur at various timings and in different orders.

Note that the print processing includes a case where all the file ID of image data to be printed are sent in the print start request (StartJob) from the DSC 3012 and printing is performed, and a case where only a file ID of DPOF file used in a general photography development is included in the print start request (StartJob) from the DSC 3012 to the PD printer 1000. Then the PD printer 1000 interprets the DPOF file, obtains a file ID of necessary image data and performs printing.

FIG. 7 depicts an example of the print start request issued from the DSC 3012 to the PD printer 1000.

In FIG. 7, numeral 720 denotes the configuration of the print job (jobConfig); and numeral 721 denotes print information (printInfo).

First, the configuration 720 will be described. Numeral 700 denotes print quality such as "standard" and "high quality"; numeral 701 denotes, a paper size; numeral 702 denotes a paper type such as "normal paper", "photographic paper" and "ink-jet paper"; numeral 703 denotes designation of type of image file to be printed, such as DPOF; numeral 704 denotes execution/non-execution of date printing; numeral 705 denotes execution/non-execution of file name printing; numeral 706 denotes execution/non-execution of image optimization; numeral 707 denotes fixed size printing; and numeral 708 denotes execution/non-execution of printing within a designated range of an image. Further, the print information 721 includes a file ID 709 and date information 710.

FIGS. 8A and 8B depict tables showing information included in the above-described JobStatus and DeviceStatus transmitted from the PD printer 1000 to the DSC 3012. Further, the DSC 3012 can request transmission of these information from the PD printer 1000 at an arbitrary timing.

In FIG. 8A, "prtPID", "ImagePath" and "copyID" are valid when DPOF file printing has been designated. "prtPID" is identification information (ID) of a print section designated in the DPOF file; "ImagePath", information of a path to specify an image file designated in the DPOF file; and "copyID", information indicating a currently-printed page in printing of plural pages. In the case of DPOF file printing, the DSC 3012 describes "fileID" of the DPOF file in a print start request (StartJob) and transmits the request to the PD printer 1000. Based on the request, the PD printer 1000 starts printing of the DPOF file. The PD printer 1000 obtains the DPOF file based on the "fileID", and performs "GetFileID" to specify "fileID" of the image file designated in the DIPOF, then requests the image file from the DSC 3012 and obtains the image data. Thus the image designated in the DPOF file can be printed. During the DPOF printing, the above "prtPID", "ImagePath" and "copyID" indicating the progress of printing are notified in the above-described "NotifyJobStatus" from the PD printer 1000 to the DSC 3012.

Note that in a case where the DPOF printing has been suspended for some reason and then restarted, the printing has restarted from the head of the page where print-suspension occurred.

"progress" indicates the currently printed page of print pages (N/T). "N" is the currently printed page, and "T" is the total number of pages. "imagePrinted" indicates the number of printed images.

Next, "DeviceStatus" will be described.

"dosPrintServiceStatus" indicating the status of the PD printer 1000, is notified to the DSC 3012. The status includes "idle", "print" and "pause" statuses. "jobEndReason," indicating the situation of the completion of printing, is notified to the DSC 3012 when the printing of the final page has been completed. "errorStatus," indicating the status of error, is notified when an error, has occurred. "errorReason" indicating the cause of error is notified with "errorStatus". "disconnectEnable", indicating that printing is possible even if the USB cable 5000 is removed, is notified from the PD printer 1000 to the DSC 3012. "CapabilityChanged", indicating that the Capability of the PD printer 1000 has been changed, is notified to the DSC 3012. "newJobOK," indicating that the PD printer 1000 can receive a print request, is notified to the DSC 3012.

Figure 9:
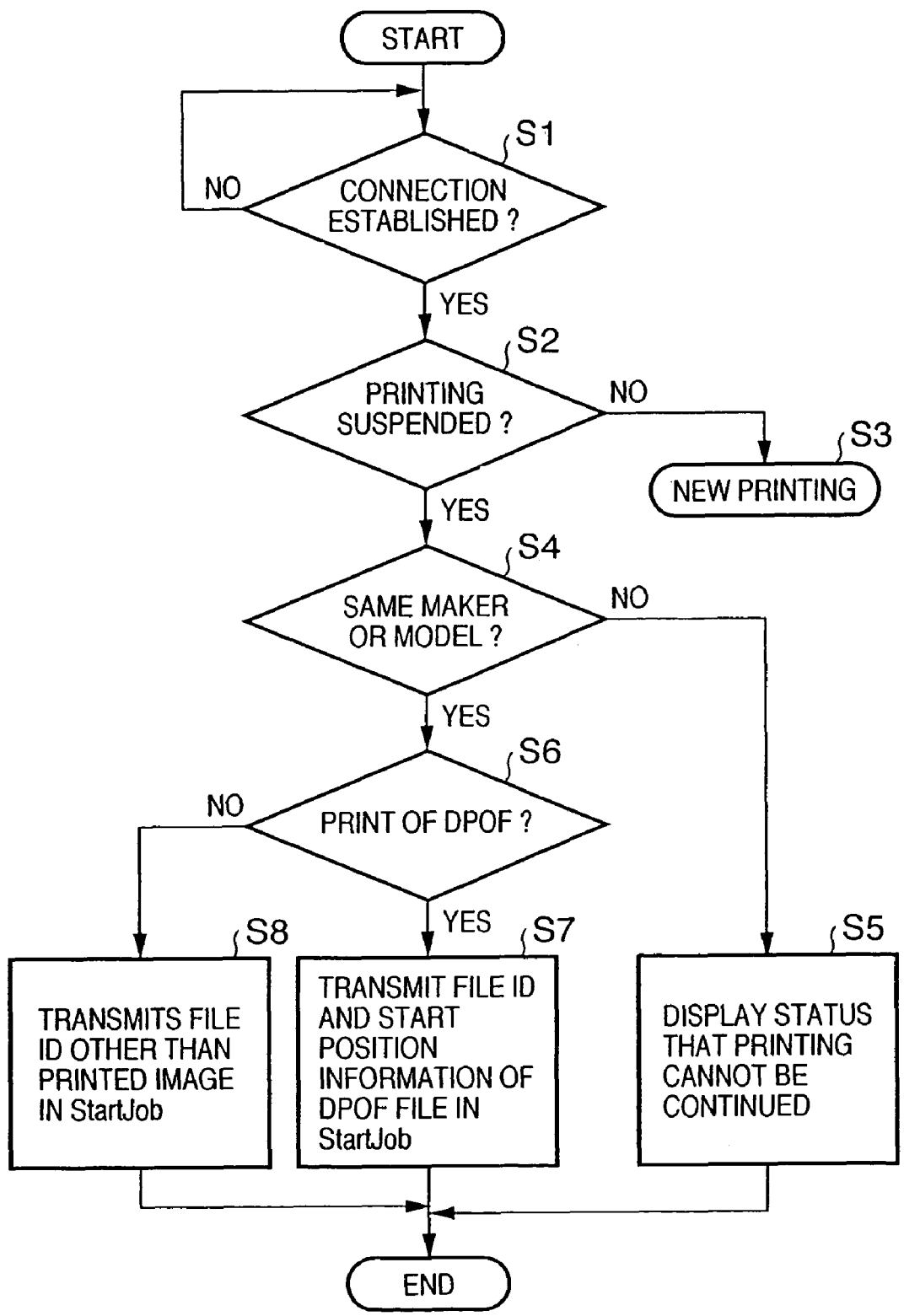
FIG. 9 is a flowchart showing print restart processing by the DSC according to the embodiment.

FIG. 9 is a flowchart showing print restart processing by the DSC 3012 according to the present embodiment. Note that a program for executing the processing is stored in the ROM 3101, and the processing is realized by execution of control processing by the CPU 3100 in accordance with the program.

The processing is performed in a case where, during a print job, the print operation is stopped due to, e.g., disengagement of the cable 5000, then DPS reconnection is established, then the print button of the DSC 3012 is depressed, and the PD printer 1000 is instructed to restart the print operation, thereby restarting the printing in the PD printer 1000.

That is, to perform the print restart processing, it is necessary to recognize that print processing has been suspended in the PD printer 1000 and print processing has been suspended in the DSC 3012.

First, at step S1, it is determined whether or not DPS reconnection has been established by reconnection of the cable 5000 or the like and a physical connection has been made between the DSC 3012 and the PD printer 1000. If it is determined that the connection has been established, the process proceeds to step S2. At step S2, when print restart is designated in the DSC 3012, it is determined whether or not the printing is suspended. If the printing is not suspended, the process proceeds to step S3, at which normal processing such as start of printing in accordance with a new print instruction is performed.

If it is determined that the printing is suspended, the process proceeds to step S4, at which it is determined whether the newly connected PD printer 1000 is of the same model as that of the previously connected (upon suspension) PD printer (<dpsVersion> and <productName> are the same), or the newly connected PD printer 1000 is a product of the same vendor (<vendorName>). The determination is made based on the contents of a response from the PD printer 1000 to "ConfigurePrintService" issued from the DSC 3012. In a case where the same PD printer is reconnected, there is no problem. In a case where a different PD printer is reconnected but the printer is a product of the same maker or vendor, it is determined that the printing can be restarted if the print restart processing according to the present embodiment can be performed based on the design of the maker or vendor, and the process proceeds to the subsequent steps. If NO at step S4, the process proceeds to step S5 at which it is determined that the printing cannot be continued and a message indicating that the print restart is impossible is displayed on the display 2700. Further, at this time, the UI (user menu screen image) displayed on the display 2700 may be changed in accordance with necessity.

At step S4, if it is determined that the same printer has been reconnected or a printer of corresponding model has been connected, the process proceeds to step S6, at which it is checked whether or not the suspension has occurred during DPOF file printing. If YES, the process proceeds to step S7, at which the file ID Of the DPOF file is transmitted to the PD printer 1000. In this case, so as not to print an image file of an already-printed page, the above-described "prtPID", "imagePath" and "copyID" are transmitted with the file ID of the DPOF file, thereby designating a file from which printing is to be restarted in the DPOF file.

On the other hand, at step S6, if the suspension has not occur during DPOF file printing, i.e., printing has been performed based on a designation of respective image files, file IDs of images files except already-printed image files are transmitted at once to the PD printer 1000 and printing is performed. Note that the designation of print restart is made by depression of the print button among the operation buttons of the DSC 3012 and transmission of "StartJob" from the DSC 3012 to the PD printer 1000.

Note that the completion of printing of each page is notified from the PD printer 1000 to the DSC 3012 by "jobStatus" (meaning the start of printing of the next page) sent from the PD printer 1000 at the head of the next page, or in the case of final page, by "jobEndReason" included in "deviceStatus". Accordingly, the DSC 3012 can check the number of printed images. In a case where each image is printed on one sheet, the DSC 3012 checks whether or not the printing for the number of images designated with the print command has been completed, or in the case of DPOF file printing, checks the progress of printing in the DPOF file ("prtPID", "ImagePath" and "copyID") or whether or not the printing has been completed, thereby determining whether or not printing has been suspended.

In a case where one image is printed in one page, the number of print sheets and the number of images are the same. However, when plural (N) images are laid out in one sheet, the number of images and the number print sheets are different. In the DSC 3012, it is necessary to perform coordination between the number of print sheets and the number image data in correspondence with the print mode.

In FIG. 7, if date printing <datePrint> 704 is designated in the <jobConfig> 720, date data <date> 710 included in the <printInfo> 721 is printed. Further, if date printing <date-Print> 704 is not designated in the <jobConfig> 720, even if the date data <date> 710 is included in the <printInfo> 721, the date data is ignored and not printed. In this manner, as the freedom of data included in the <printInfo> 721 is increased, a startJob command can be generated by, e.g., attaching image data and date list used in another job to the <printInfo> 721.

Figure 10:
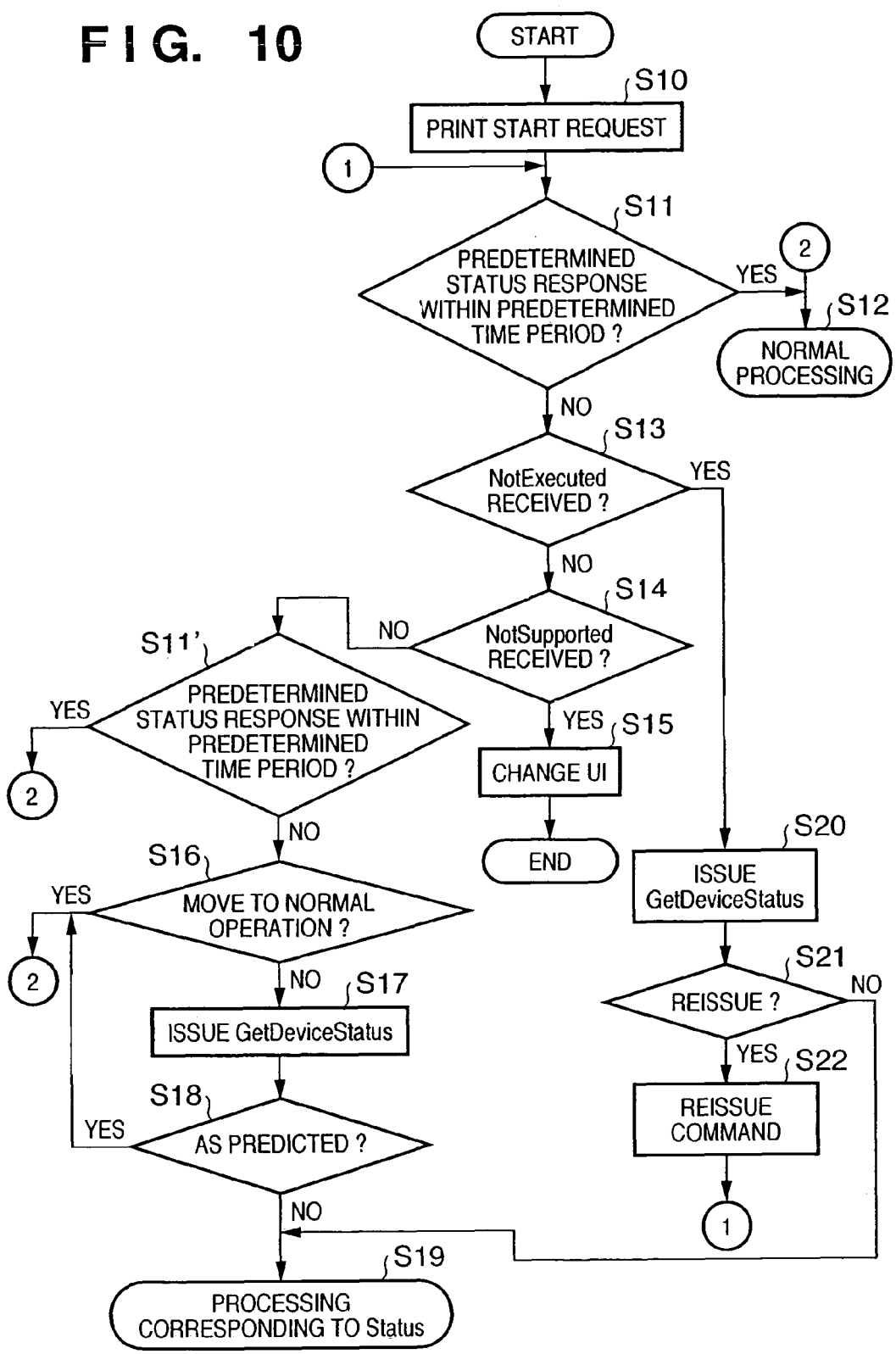
FIG. 10 is a flowchart showing processing by the DSC according to the embodiment.

FIG. 10 is a flowchart showing processing in the print system according to the present embodiment.

In this embodiment, in a case where the DSC 3012 issues some command to the PD printer 1000, if the status of the PD printer 1000 is changed in accordance with the command, the changed status is notified in the above-described "NotifyDeviceStatus" from the PD printer 1000 to the DSC 3012. However, if the status of the PD printer 1000 has not been changed or if the response to the command from the DSC 3012 has been delayed, it is determined (presumed) in the DSC 3012 that the predicted change of the status has occurred and processing corresponding to the change is performed. Further, to check the status of the PD printer 1000, "GetDeviceStatus" is issued to the PD printer 1000, thereby obtaining the status of the PD printer 100, and processing corresponding to the obtained status is performed.

Hereinbelow, an example of the above process will be described with reference to the flowchart of FIG. 10.

First, at step S10, the print start request "StartJob" is issued to the PD printer 1000. Next, the process proceeds to step S11, at which it is determined whether or not a predetermined status response "NotifyDeviceStatus" is sent from the PD printer 1000 within a predetermined period of time. In a case where the PD printer 1000 receives only one print job, when the print start request "StartJob" is issued, "newJobOK" in the "NotifyDeviceStatus" indicating that the PD printer 1000 can receive the next print job is "False". Thus, if a normal response has been received at step S11, the process proceeds to step S12, at which normal print processing, such as issuance of the next command when "newJobOK" has become "True" is performed or outputting image data is performed in response to a request from the PD printer 1000.

If a normal response has not been received at step S11, the process proceeds to step S13, at which it is determined whether or not "NotExecuted" indicating that printing was not performed has been received.

If it is determined that "NotExecuted" has been received, the process proceeds to step S20, at which "GetDeviceStatus" is issued to the PD printer 1000, and the status of the PD printer 1000 is obtained. If the reason why the command has not been executed is detected and reissuance of the command is possible, the information is displayed on the UI on the display 2700. If the user has instructed to reissue the command, the process proceeds from step S21 to S22, at which the command that has not been previously executed is reissued to the PD printer 1000. When the instruction of reissuance has not been inputted, the process proceeds from step S21 to step S19.

Further, if it is determined at step S13 that "NotExecuted" has not been received, the process proceeds to step S14, at which it is determined whether or not "NotSupported" has been received. If it is determined that "NotSupported" has been received, the process proceeds to step S15. In this case, as the previously issued command is not supported in the PD printer 1000, the information indicating that the command is not supported in the PD printer 1000 is displayed as, e.g., "unselectable", on the UI on the display 2700.

Further, if it is determined at step S14 that "NotSupported" has not been received, the process proceeds to step S11', at which it is determined whether or not a predetermined status response has been received within a predetermined time period. If it is determined at step S11' that the predetermined status response has been received, the process proceeds to the above-described step S12, at which the normal operation is continued. On the other hand, if it is determined at step S11' that the predetermined status response has not been received within the predetermined time period, the process proceeds to step S16, at which it is determined whether or not the operation is to be continued as the normal operation. The determination may be made by the user with the above-described UI displayed on the display 2700. If the normal operation is to be continued, the process proceeds to step S12. On the other hand, if the operation is not to be continued as the normal operation since the user's instruction or the like has not been made, the process proceeds to step S17, at which "GetDeviceStatus" is issued to request the status of the PD printer 1000. Next, the process proceeds to step S18, at which if the obtained status is a normal status, it is determined that the obtained status is a normally-predicted status and the process proceeds to the normal processing at step S12. If other status has been obtained, the process proceeds to step S19, at which processing corresponding to the obtained status is performed.

Note that in a case where the PC 3010 is connected to the PD printer 1000, a print instruction may be received from the PC 3010 at approximately the same time of reception of a print start request from the DSC 3012. In this case, as print processing based on the print data from the PC 3010 has been started, unexpected "NotExecuted" is returned at step S13. Further, in a case where the PD printer 1000 is capable of receiving plural print jobs, even when a print request "Start-Job" has been received, "newJobOK" in "DeviceStatus" may be still "True" and as a result, "NotifyDeviceStatus" may not be issued from the PD printer 1000. In this case, since there is a possibility that the issuance of "NotifyDeviceStatus" notifying the status "False" of "newJobOK" is delayed for some reason, it is safe on the DSC 3012 side to operate on the assumption that "newJobOK" is "False" as the status of the PD printer 1000 until the status of the PD printer 1000 has been confirmed.

Next, processing upon continuation of printing or suspension of printing by the DSC 3012 in the print system according to the present embodiment will be described. Since the construction of the print system and constructions of the DSC 3012 and the PD Printer 1000 are the same as those described above, the explanation thereof will be omitted.

Figure 11:
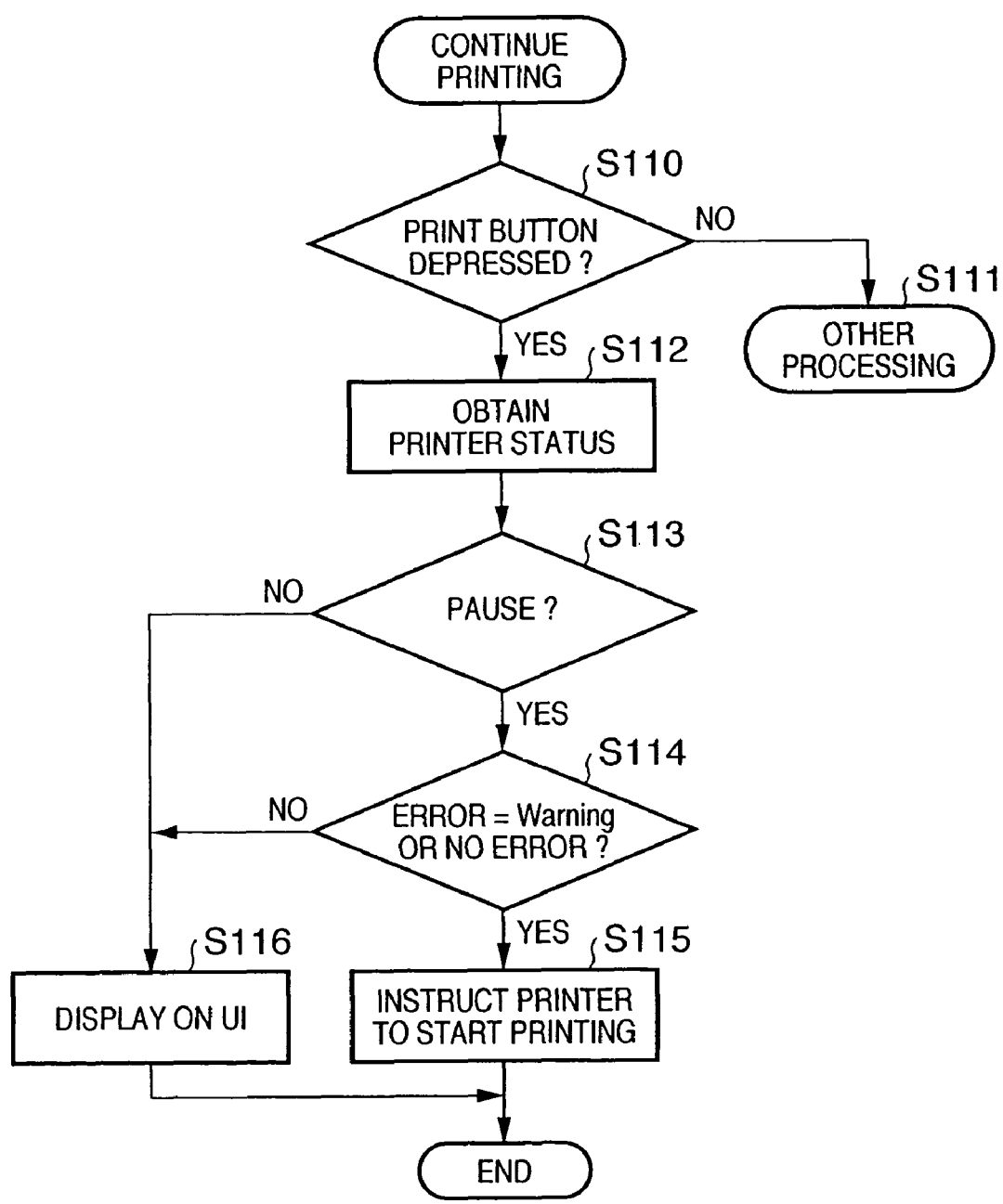
FIG. 11 is a flowchart showing processing accompanying a button manipulation for print continuation in the DSC according to the embodiment.

FIG. 11 is a flowchart showing print continuation processing executed by depression of the print button to instruct print restart when print processing in the DSC 3012 has been suspended, according to the present embodiment.

First, at step S110, it is determined whether or not the print button of the operation button group 3103 of the DSC 3012 has been depressed. If the print button has not been depressed, the process proceeds to step S111, at which other processing such as processing in accordance with a depressed button or waiting for depression of button is performed. If the print button has been depressed, the process proceeds to step S112, at which "GetDeviceStatus" is issued to the PD printer 1000, to request status information from the PD printer 1000, and the status information sent from the PD printer 1000 in response to the request is obtained. Then the process proceeds to step S113, at which it is determined, based on the status information, whether or not the status of the PD printer 1000 is "pause". If YES, the process proceeds to step S114, at which it is determined whether or not the status is "Warning"

due to a past error (e.g., disengagement of the cable), or whether or not an error has occurred. If YES, it is determined that the print processing can be restarted (since the status from the PD printer 1000 has been received), and the process proceeds to step S115, at which the PD printer 1000 is instructed to restart the print processing (transmission of "ContinueJob").

Further, if it is determined at step S113 that the status of the PD printer 1000 is not "pause" or if it is determined at step S114 that another error has occurred, it is determined that the printing cannot be restarted, and the information is displayed on the UI on the display 2700. In this case, a message may be displayed on the display 2700 to notify a user that the printing cannot be restarted, and/or selection of the print button may be disabled. Further, it may be arranged such that the status of the printer is obtained before the determination of depression of the print button at step S110 and ON/OFF of the print button is set, thereby preventing the user's wasteful depression of the print button.

Figure 12:
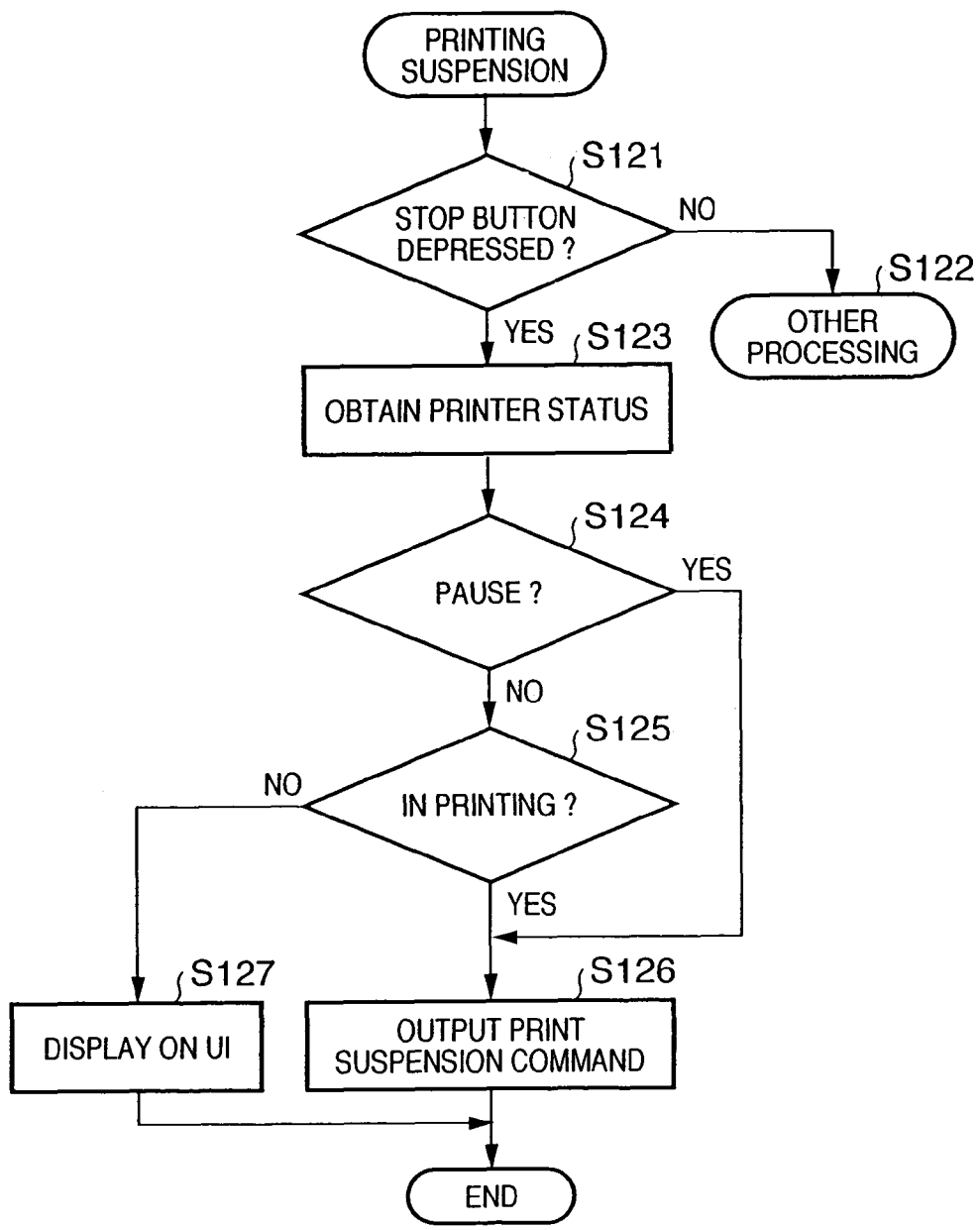
FIG. 12 is a flowchart showing processing accompanying a button manipulation for print stoppage in the DSC according to the embodiment.

FIG. 12 is a flowchart showing print stoppage processing executed by depression of the print stop button to instruct to stop print processing by the DSC 3012, according to the present embodiment.

First, at step S121, it is determined whether or not the stop button of the operation button group 3103 of the DSC 3012 has been depressed. If NO, the process proceeds to step S122, at which other processing, such as processing in accordance with a depressed button or waiting for depression of button, is performed. If the stop button has been depressed, the process proceeds to step S123, at which "GetDeviceStatus" is issued to the PD printer 1000, to request status information from the PD printer 1000, and the status information sent from the PD printer 1000 in response to the request is obtained. Then the process proceeds to step S124, at which it is determined, based on the status information, whether or not the status of the PD printer 1000 is "pause". If YES, the process proceeds to step S126, while if NO, the process proceeds to step S125, at which it is determined whether or not printing is currently performed. If YES at step S125, it is determined that the print processing can be stopped, then the process proceeds to step S126, at which the PD printer 1000 is instructed to stop the print processing (transmission of "AbortJob").

Further, if it is determined at step S125 that printing is not currently performed, the process advances to step S127, it is determined that stoppage of print processing is impossible, and the information is displayed on the UI on the display 2700. In this case, a message may be displayed on the display 2700 to notify a user that the stoppage of printing cannot be performed, and/or selection of the stop button may be disabled. Further, it may be arranged such that the status of the printer is obtained before the determination of depression of the stop button at step S121 and ON/OFF of the print button is set, thereby preventing the user's wasteful depression of the print button.

In the above embodiment, processing in the DSC 3012 has been mainly described. Next, processing by the PD printer 1000 to obtain image data from the DSC 3012 will be described. Note that since the hardware construction in this description is the same as that in the above description, the explanation of the hardware construction will be omitted.

Figure 13:
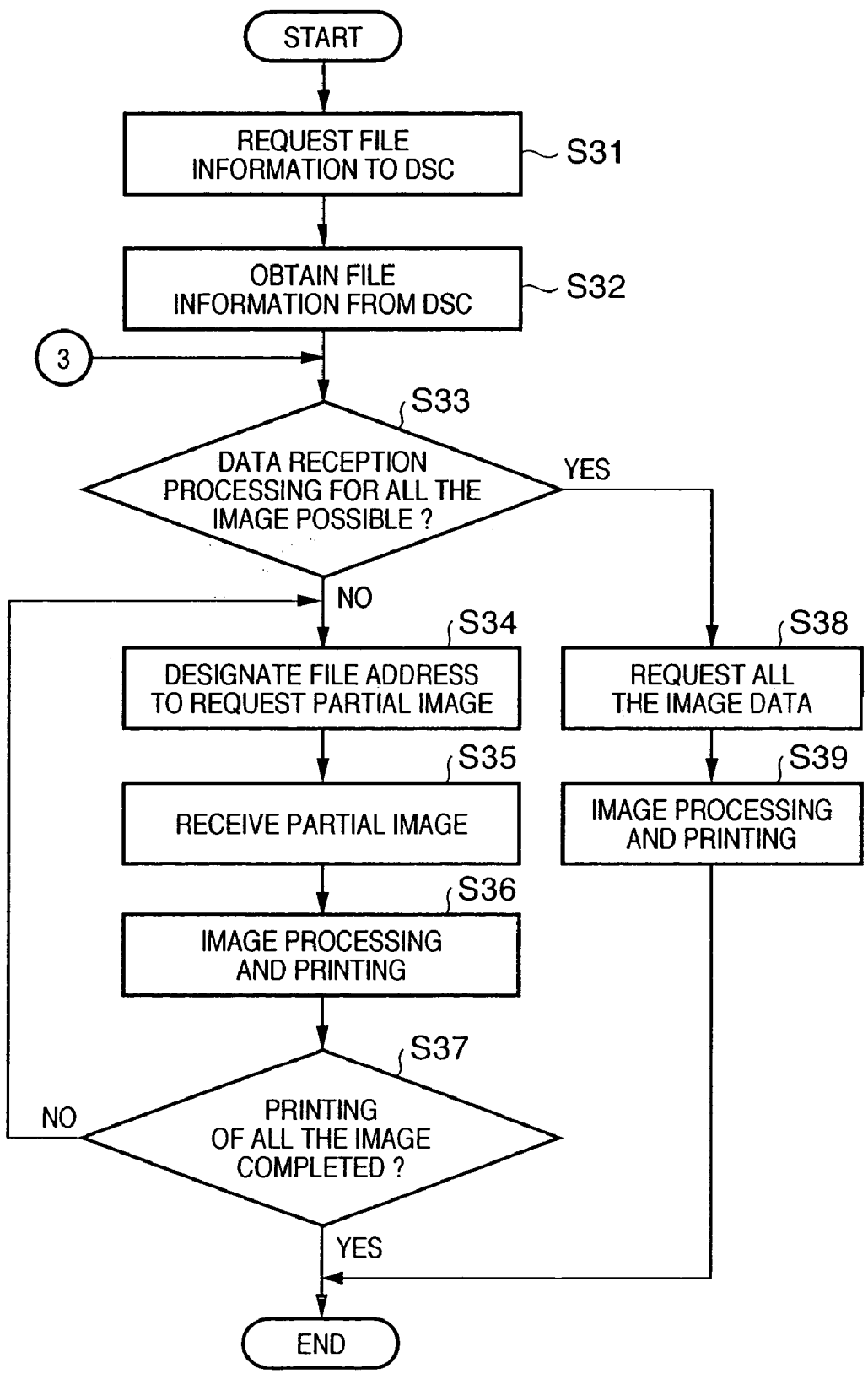
FIG. 13 is a flowchart showing processing by the PD printer according to the embodiment.

FIG. 13 is a flowchart showing image data acquisition processing by the PD printer 1000 according to the present embodiment. Note that a program for executing the processing is stored in the program memory 3003*a*, and is executed under the control of the DSP 3002.

The processing is started when a print request ("StartJob") is sent from the DSC 3012 and start of print processing is designated. First, at step S31, "GetFileInfo" is sent to the DSC 3012, to request information on an image file to be printed from the DSC 3012. At step S32, information on the image file (data amount and the like) is sent from the DSC 3012, then information indicating a file capacity included in the information is obtained. The process proceeds to step S33, at which it is determined whether or not it is possible to receive all the image file at once and process it. The determination is made based on the memory capacity of available area in the memory 3003 of the PD printer 1000. If it is determined that all the image data cannot be received, the process proceeds to step S34, at which a reading start address and a reading amount of the image file are designated, and a request for partial image data of the image file is made by using "GetParatialFile". The DSC 3012 reads a designated partial image data from the image file and transmits the partial image data to the PD printer 1000. At step S35, the PD printer 1000 receives the partial image data, and then at step S36, processes the partial image data and performs printing. Next, the process proceeds to step S37, at which it is determined whether or not all the image data of the image file has been print-outputted. If NO, the process returns to step S34, at which a request for the next partial image data is made. Thus, the above processing is repeatedly performed until all the image data of the image file has been received and print-outputted.

Further, if it is determined at step S33 that it is possible to receive all the image data of the image file and process the data, the process proceeds to step S38, at which a request for all the image data of the image file from the DSC 3012 is made. At step S39, all the image data of the image file, sent from the DSC 3012 in response to the request, is received and print-outputted.

Figure 14:
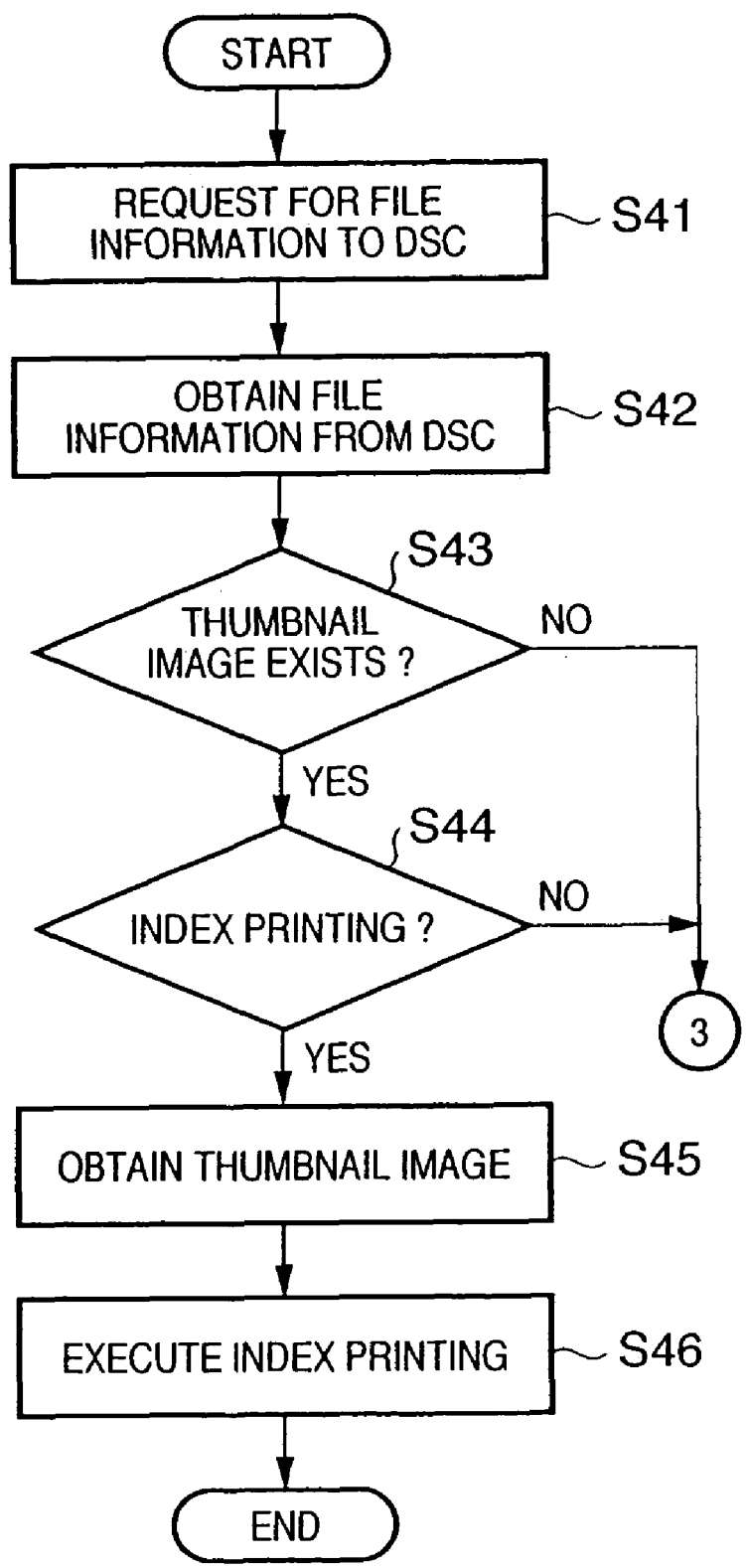
FIG. 14 is a flowchart showing processing by the PD printer according to the embodiment.

FIG. 14 is a flowchart showing another example of the image data acquisition processing by the PD printer 1000 according to the present embodiment. Note that a program for executing the processing is stored in the program memory 3003*a*, and the processing is performed under the control of the DSP 3002.

The processing is started when a print request ("StartJob") is sent from the DSC 3012 and start of print processing is designated. First, at step S41, "GetFileInfo" is sent to the DSC 3012, to request information on an image file to be printed from the DSC 3012. At step S42, information on the image file is sent from the DSC 3012, and then the process proceeds to step S43, at which it is determined whether or not the image file includes a thumbnail image. If YES, the process proceeds to step S44, at which it is determined whether index printing has been designated at the operation unit 101. If the index printing has been designated, the process proceeds to step S45, at which a request for thumbnail image data from the DSC 3912 is issued ("GetThumb" is issued), and the thumbnail image data is obtained. The process proceeds to step S46, at which index printing based on the obtained thumbnail image is performed.

Note that if it is determined at step S43 that the image file does not include any thumbnail image, or if it is determined at step S44 that index printing has not been designated, the process proceeds to step S33 (FIG. 13), at which the above-described image print processing is performed.

According to the present embodiment, in correspondence with the memory capacity, the processing capability and the like of the PD printer 1000, the amount of image data obtained from the DSC 3012 at once can be changed and inputted from the DSC 3012.

Further, since the existence of thumbnail image stored in an image file can be previously determined, in a case where index printing is designated in the PD printer 1000, generation of thumbnail image in the PD printer 1000 can be omitted. Thus a thumbnail image can be quickly printed.

FIG. 15 depicts an explanatory diagram of a code format for notification of the error type or the like from the PD printer 1000 to the DSC 3012 according to the present embodiment. FIG. 15 shows an 8-digit hexadecimal character code (XXXX, YY, ZZ).

In the code, the higher 4 digits (2 bytes: XXXX) are allocated to a major code; the next lower 2 digits (1 byte: YY), are allocated to a minor code; and the next lower 2 digits (1 byte: ZZ) are allocated to a detail code. Note that as the minor code and the detail code, "00" is default; each of "01 (Hex)" to "7F (Hex)" is a predetermined common code for respective companies; and each of "80 (Hex)" to "FF (Hex)" is a maker's unique code.

In this setting, as the minor code, a common minor code and a maker's unique code can be used, and a common detail code for the respective companies and a maker's unique detail code can be used. A common specification and unique specification can be set in plural areas in 1 code, the freedom of product designing can be increased and the product can be differentiated from other products, and further, commonality of specification with the other products can be attained. That is, in a case where a product with a great deal of originality is to be designed, unique codes are used as the minor code and the detail code. On the other hand, in a case where designing aimed at commonality of specification with the other products is made, common codes may be used. Thus code allocation can be performed without impairing adaptivity of the design concept.

Note that if it is arranged such that the camera transmits information to specify itself (information to specify an image supply device) or the maker name to the printer side, and the controller 3000 of the printer side (or DSP 3002) selects a common code or a vendor's unique code in the above-described code allocation to the minor code and detail codes, in correspondence with whether or not the maker of the connected DSC 3012 is the same as that of the printer, convenience for the user can be further increased.

FIG. 16 depicts an explanatory diagram of another code format for notification of status or the like from the PD printer 1000 to the DSC 3012 according to the present embodiment. FIG. 16 shows a 8 digit hexadecimal character code (XXXX, YYYY).

In the code, the higher 4 digits (2 bytes: XXXX) are allocated to a major code; and the lower 4 digits (2 bytes: YYYY) are allocated to a minor code. As the meaning of the code, in accordance with its value, "0000" is default; each of "0001 (Hex)" to "7FFF (Hex)" is a common code for the respective companies; and each of "8000 (Hex)" to "0FFFF (Hex)" is a maker's unique code.

The status code shown in FIGS. 15 and 16 is basically the same in processing on the reception side. For example, a major code (XXXX) indicating the occurrence of ink trouble, a minor code indicating "cyan ink low level" (the residual amount of cyan ink is small) and the maker's unique code indicating that "merely 10% cyan ink remains" can be included in one code.

In the case a message is displayed based on only the major code, "Trouble occurs in printer ink" is displayed on the display 2700 of the DSC 3012. However, if the minor code is further used, a message "The residual amount of cyan ink is reduced. Prepare new ink cartridge", for example, can be displayed. Thus, a more detailed display can be produced. Further, if the maker's unique code is further handled, a message "Only 10% cyan ink remains. Exchange ink cartridge for new one when residual amount becomes 5%", for example, can be displayed. In this manner, as the 3-level information can be transmitted in the same code, status notification of various conditions can be made.

Note that in FIG. 16, as the common code and the vendor's unique code are set only exclusively, the printer side selects a common code or a vendor's unique code in accordance with whether or not the maker of the connected DSC 3012 is the same as that of the printer. It is convenient in automation to perform the selection by a determination of the maker based on the above-described Capability information. However, the selection may be performed by manual setting, recognition of maker by another particular method, or the user's preference.

Figure 17:
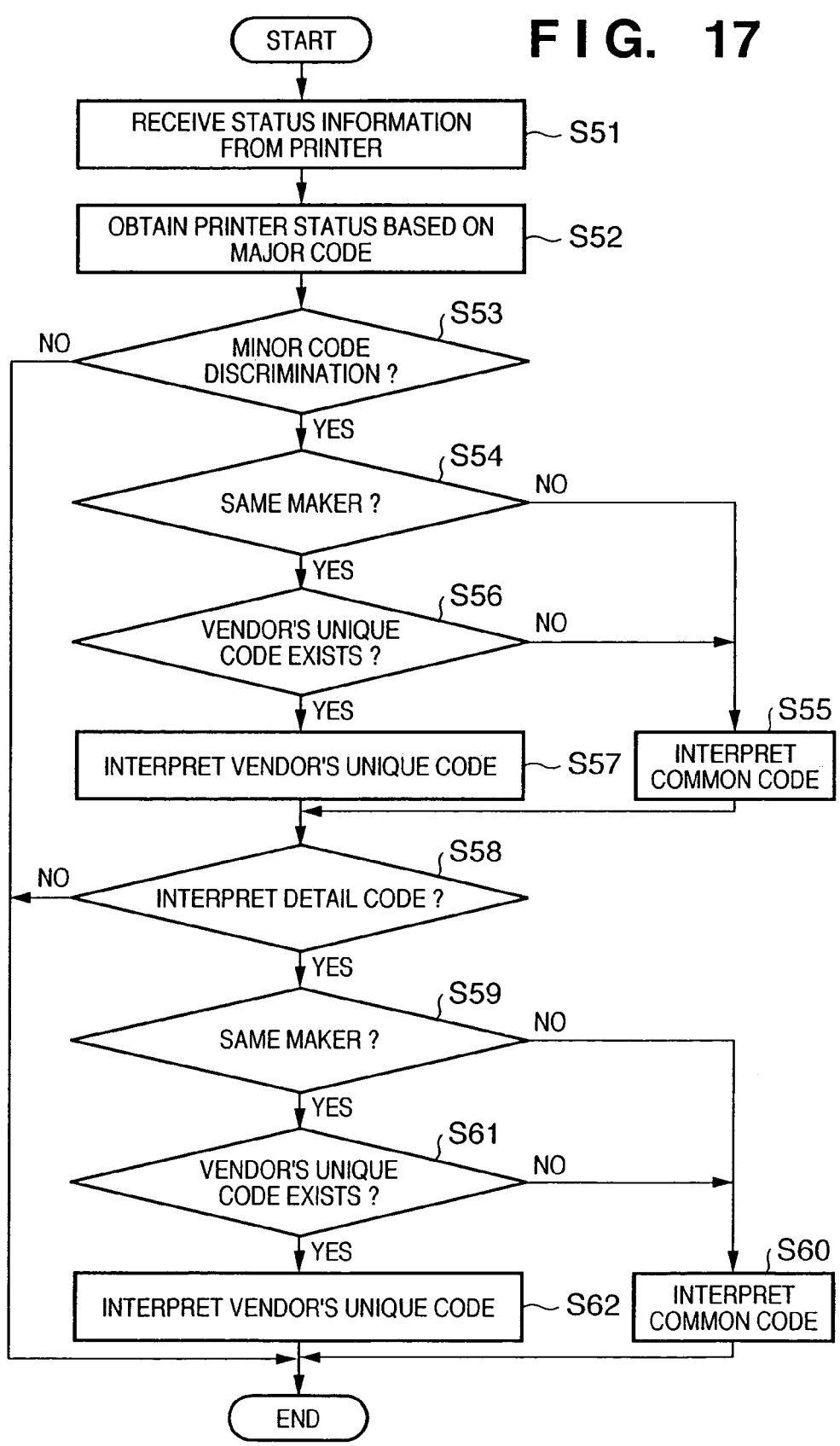
FIG. 17 is a flowchart showing processing in an image supply device according to the embodiment.

FIG. 17 is a flowchart showing processing in an image supply device such as the DSC 3012 according to the present embodiment. Note that a program for executing the processing is stored in the ROM 3101 in the case of the DSC 3012.

First, at step S51, the status information from the connected PD printer 1000 is received. The format of the status information is, e.g., as shown in FIG. 15. Next, at step S52, the status of the PD printer 1000 is obtained based on the major code included in the status information. Note, the major code can be discriminated by any type of image supply device which is connected to the printer 1000 and able to print an image using the printer 1000.

Next, the process proceeds to step S53, at which it is determined whether or not the minor code included in the status information is to be discriminated. The determination is made in accordance with the degree of status determination based on the function of the image supply device. If the minor code is to be discriminated, the process proceeds to step S54, at which it is determined whether or not the PD printer 1000 is a product of the same maker as that of the image supply device. If YES, the process proceeds to step S56, at which it is determined whether or not the minor code includes a vendor's unique code. If the minor code includes a vendor's unique code, the process proceeds to step S57, at which the vendor's unique code is interpreted, and more detailed status information on the PD printer 1000 is obtained. Then the process proceeds to step S58.

On the other hand, if it is determined at step S54 that the PD printer 1000 is not a product of the same maker or if it is determined at step S56 that the minor code does not include a vendor's unique code, the process proceeds to step S55, at which a common code included in the minor code is interpreted, and the process proceeds to step S58.

At step S58, it is determined whether or not the detail code included in the status information is to be discriminated. As in the case of the above-described step S53, the determination is made in accordance with the degree of status determination based on the function of the image supply device. If the detail code is to be discriminated, the process proceeds to step S59, at which it is determined whether or not the PD printer 1000 is a product of the same maker as that of the image supply device. If YES, the process proceeds to step S61, at which it is determined whether or not the detail code includes a vendor's unique code. If the minor code includes the vendor's unique code, the process proceeds to step S62, at which the vendor's unique code is interpreted, and more detailed status information on the PD printer 1000 is obtained.

On the other hand, if it is determined at step S59 that the PD printer 1000 is not a product of the same maker or if it is determined at step S61 that the detail code does not include the vendor's unique code, the process proceeds to step S60, at which a common code included in the detail code is interpreted.

As described above, according to the image supply device according to the present embodiment, in accordance with the function of the device itself and the maker or the like of the connected PD printer 1000, the status information of the PD printer 1000 can be obtained.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can also be achieved by providing a storage medium (or recording medium) holding software program code for realizing the aforesaid functions of the embodiment to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

As described above, according to the present embodiment, in a case where print processing in a PD printer is suspended due to disengagement of a cable connecting a DSC with the PD printer, then restart of the printing becomes possible by re-engagement of the cable, and the print processing can be reliably restarted.

Further, upon restart of printing based on a DPOF file and upon restart of printing based on respective image data sequentially sent from the DSC to the printer, printing can be reliably restarted by changing image data resent from the DSC to the printer.

Further, in the DSC according to the present embodiment, in a case where a command such as StartJob or AbortJob is issued to the printer, even if a response from the printer has not been received, it is presumed that the printer has entered a predetermined status and the next operation can be determined. Further, a command to check the status is issued to the printer, and the status of the printer at that time can be discriminated.

Further, in a case where the PD printer has returned to a particular status to the DSC, processing in correspondence with the status is performed. For example, in the case of "NotExecuted", a command to inquire about the printer status is issued, and a command to be issued next is determined based on a response to the command. Further, in the case of "NotSupported", since the previously issued command is not supported in the printer, processing not to issue the command by e.g. changing the UI displayed on the display unit is performed. Thus retransmission of wasteful command to the printer can be prevented.

Further, according to the present embodiment, in correspondence with the memory capacity, processing capability or the like of the printer, the amount of image data to be obtained from the DSC at once is controlled upon reading of image data, and the image data can be processed and print-outputted.

Further, according to the present embodiment, as the degree of details of error/status information can be allocated to the code format of the information, brief information to detailed information can be set in one code. Thus information of the error or status can be notified with one code to various devices including home electric appliances and AV devices as well as the digital still camera.

Further, according to the present embodiment, plural ranges of interpretation are provided for code information sent in correspondence with a predetermined event, and the range of reference in the code differs in correspondence with the level of interpretation of interpretation means. Even in control in correspondence with the same event, the content of various controls such as display can be changed in accordance with the level of interpretation.

On the other hand, on the code issuing side, a code corresponding to the detection level of e.g. an error detection unit can be transmitted. That is, even in a code given in correspondence with the same event, as the level of notification can be changed in accordance with the capability of receiving apparatus, the freedom of apparatus designing is increased. For example, in a low-cost product, only brief information (major code) by brief detection may be included in an error code, whereas in a product capable of detailed detection, more detailed information (minor code) may be included in the code upon notification. In this manner, even the control capability and detection capability of device differ in each device, commonality can be attained in typical notification. Thus, even in communication between products of different makers, information transmission to some level can be assured.

On the other hand, by utilizing a maker's unique code, it is possible to provide a product capable of communication with a product of the same maker, differentiated from communication with other maker's product.

The embodiments are described by giving an example of a digital camera and printer, but the present invention is not limited to a case of the digital camera and printer, and may be applied to a communication apparatus such as a PC, for transmitting and receiving image data and status information.

The present invention is not limited to the above embodiments and various changes and modifications can be made within the spirit and scope of the present invention. Therefore, to appraise the public of the scope of the present invention, the following claims are made.

The invention claimed is:

1. An image supply device capable of transmitting image data to a recording apparatus so as to record an image, the image supply device comprising:
    a reception unit that receives a single code transmitted from the recording apparatus, the single code being represented by eight-digit hexadecimal codes and including (a) a major code and (b) a minor code that indicates a detailed description of an error event represented by the major code;
    an analysis unit that analyzes the single code received by said reception unit;
    a determination unit that compares a vendor code of the image supply device with a vendor code of the recording apparatus, and if it is determined that the vendor code of the image supply device matches the vendor code of the recording apparatus, then determines to notify a user of the image supply device of the major code and the minor code of the single code, and if it is determined that the vendor code of the image supply device does not match the vendor code of the recording apparatus, then determines to notify the user of the major code of the single code; and a notification unit that notifies the user in accordance with a determination by said determination unit.

2. A recording system comprising:

a recording apparatus; and an image supply device capable of transmitting image data to said recording apparatus so as to record an image, wherein the image supply device comprises:

(1) a reception unit that receives a single code transmitted from said recording apparatus, the single code being represented by eight-digit hexadecimal codes and including (a) a major code and (b) a minor code that indicates a detailed description of an error event represented by the major code;

(2) an analysis unit that analyzes the single code received by said reception unit;

(3) a determination unit that compares a vendor code of said image supply device with a vendor code of said recording apparatus, and if it is determined that the vendor code of said image supply device matches the vendor code of said recording apparatus, then determines to notify a user of the image supply device of the major code and the minor code of the single code, and if it is determined that the vendor code of said image supply device does not match the vendor code of said recording apparatus, then determines to notify the user of the major code of the single code; and (4) a notification unit that notifies the user in accordance with a determination by said determination unit, and wherein said recording apparatus comprises a recording unit that records the image based on the image data transmitted from said image supply device.

3. A method of controlling an image supply device capable of transmitting image data to a recording apparatus so as to record an image, said method comprising:

receiving a single code transmitted from the recording apparatus, the single code being represented by eight-digit hexadecimal codes and including (a) a major code and (b) a minor code that indicates a detailed description of an error event represented by the major code;

analyzing the single code received in said receiving step;

comparing a vendor code of the image supply device with a vendor code of the recording apparatus, and if it is determined that the vendor code of the image supply device matches the vendor code of the recording apparatus, then determining to notify a user of the image supply device of the major code and the minor code of the single code, and if it is determined that the vendor code of the image supply device does not match the vendor code of the recording apparatus, then determining to notify the user of the major code of the single code; and notifying the user in accordance with a determination to notify the user.

\* \* \* \* \*